United States Patent [19]

Lunding

[11] Patent Number: 4,493,743
[45] Date of Patent: Jan. 15, 1985

[54] SHEET LAMINATING MACHINE
[75] Inventor: Thorkild Lunding, Dannike, Sweden
[73] Assignee: Kinds Industri AB, Atvidaberg, Sweden
[21] Appl. No.: 459,646
[22] PCT Filed: May 3, 1982
[86] PCT No.: PCT/SE82/00146
§ 371 Date: Jan. 3, 1983
§ 102(e) Date: Jan. 3, 1983
[87] PCT Pub. No.: WO82/03822
PCT Pub. Date: Nov. 11, 1982

[30] Foreign Application Priority Data

May 4, 1981 [SE] Sweden ................. 8102774

[51] Int. Cl.³ .............................. B32B 31/00
[52] U.S. Cl. .................... 156/555; 156/299; 156/364; 156/556
[58] Field of Search ............... 156/364, 299, 556-563

[56] References Cited

U.S. PATENT DOCUMENTS 2,484,701 10/1949 Flynn ..................... 156/364
3,112,236 11/1963 Hartmann ............... 156/364 X
3,540,970 11/1970 Huntwork ............... 156/364 X
4,288,274 9/1981 Holz ....................... 156/364

Primary Examiner—David Simmons
Attorney, Agent, or Firm—Cushman, Darby & Cushman

[57] ABSTRACT

A sheet laminating machine for uniting two or several sheets in aligned and superposed relationship to form a multi-layer sheet. The machine comprises an upper sheet-deposit unit (1) for top sheets (2), a lower sheet-deposit unit (3) for bottom sheets (4), a glue-applicator means (5) for applying glue to the upper face of the bottom sheet (4), means (6) for registering the top and upper sheets (2,4), presser means (7) and a discharge unit (8). The invention is characterized in that the registering means (6) is an upper registering plate (13) which is arranged to guide the top sheets from the upper sheet-deposit unit (1) to the plane of advancement of the bottom sheets (4), and a lower registering plate (17) which is arranged to guide the bottom sheets (4) in underneath a registering roller (18). This roller (18) rests in its starting position against the lower registering plate (17) and is mounted with some play on a shaft (23) which extends transversely of the plane of advancement. The shaft (23) is mounted so as to be vertically movable.

7 Claims, 5 Drawing Figures

SHEET LAMINATING MACHINE

BACKGROUND OF THE INVENTION

The subject invention concerns sheet-laminating machines designed to align two or more sheets to form a multiply sheet and comprising one upper and one lower sheet-deposit unit for positioning respectively top and bottom sheets, means for application of glue to the upper face of the bottom sheet, means for registering the sheets, presser means and a discharge unit.

In uniting sheets by machine as outlined above it is necessary that the sheets are carefully aligned and in register since otherwise printed articles, such as cardboard boxes and the like, made from the superposed and united sheets, after punching may take on an unacceptable appearance on account of poor registering. Problems may also arise when a thick sheet is to be laminated with a thinner one, since in such cases the two sheets usually react differently to the moisture to which they are exposed from the glueing, which may result in bulging or warping. Bulging or warped sheets may cause problems in e.g. punching machines.

Because of the requirements on alignment and evenlevelness of superposed sheets prior-art sheet-laminating machines are comparatively large and expensive devices which usually include several micro-switches or photoelectric cells as well as pneumatically driven means.

The purpose of the subject invention is to provide a sheet-laminating machine designed for automatic superposing of sheets in aligned relationship. The machine comprises a smaller number of parts than conventional machines of this kind. Consequently, the machine is cheaper to manufacture and to run and is less noisy.

SUMMARY OF THE INVENTION

The machine in accordance with the invention is characterised in that the registering means consists of an upper registering plate which is designed to guide the upper sheets from the upper sheet-deposit unit to the plane of advancement of the bottom sheets, and of a lower registering plate which is designed to guide the bottom sheets in underneath a registering roll, said roll resting, in its starting position, on the lower registering plate and being mounted on a shaft with some play, said shaft extending transversely of the plane of advancement of the sheets, and being mounted so as to be vertically movable.

Because the sheet-deposit means, the sheet presser means and sheet discharge means may be operated synchronously and are spaced only short distances apart, the total machine length is very reduced.

BRIEF DESCRIPTION OF THE DRAWINGS

One embodiment of the invention will be described in closer detail in the following with reference to the accompanying, partly diagrammatical drawings, wherein.

DETAILED DESCRIPTION OF A PREFERRED EMBODIMENT

Figure 1:
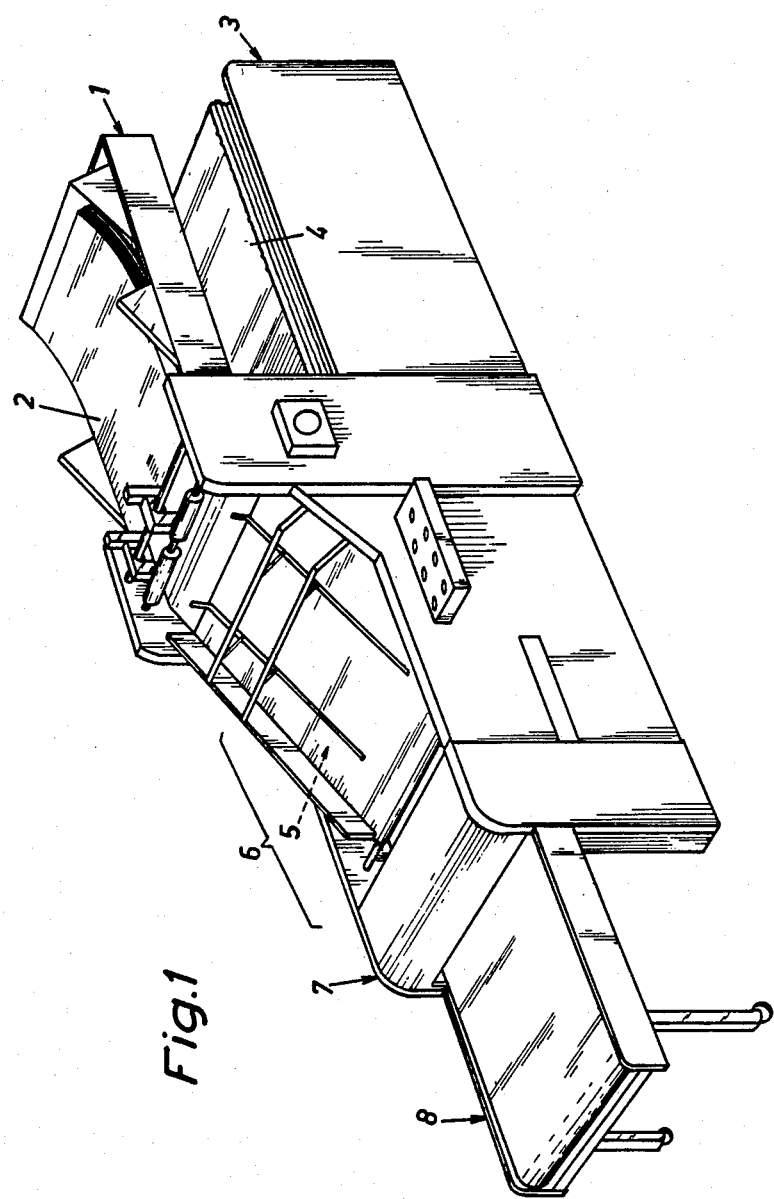
FIG. 1 is a perspective view of a machine in accordance with the invention.
Figure 2:
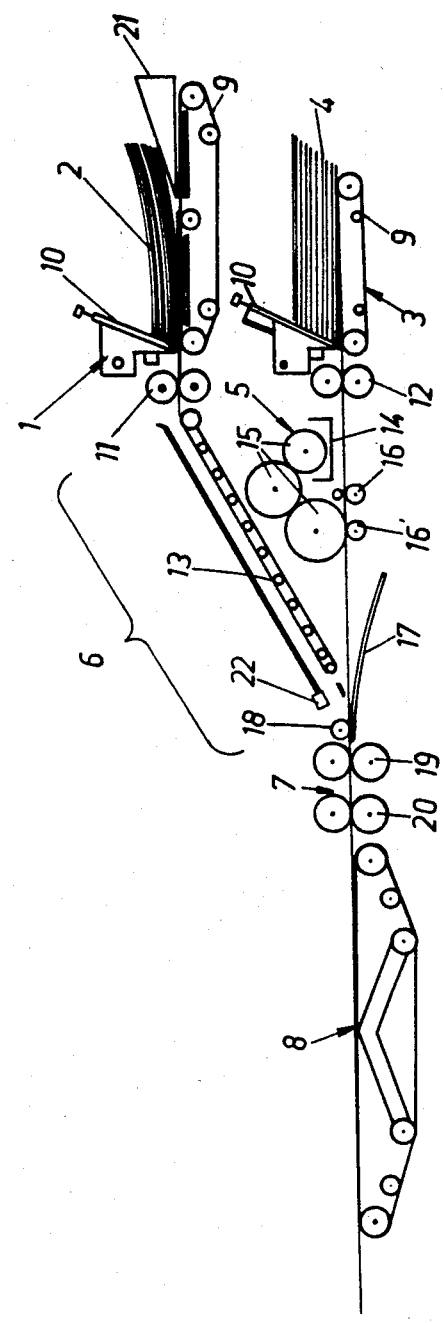
FIG. 2 is a schematic representation of the interior of the machine.

The machine illustrated in FIG. 1 is equipped with an upper sheet-deposit unit 1 for feeding and positioning top sheets 2, and with a lower sheet-deposit unit 3 for feeding and positioning bottom sheets 4. The machine likewise comprises means 5 for applying glue on the upper face of the bottom sheet 4, and means 6 designed to position the two sheets 2 and 4 in register, presser means 7 to press the two sheets together, and a discharge unit 8. The relative positions of the various means appear more clearly from FIG. 2. Both the upper sheet-deposit unit 1 and the lower sheet-deposit unit 3 are provided with their respective belt conveyor 9, which conveyors are arranged to carry sheets past separation rails 10 up to two pairs of feeder rollers 11 and 12, respectively. The upper roller pair 11 is followed in the direction of advancement of the sheets by a registering plate 13 which is arranged in an oblique position, sloping towards the plane of advancement of the bottom sheets 4. The lower roller pair 12 is followed in the direction of advancement of the sheets by the glue-applicator 5 which consists of a container 14 holding glue and a number of glue-applicator rollers 15. Adjacent the glue-applicator 5 is arranged a further pair of feeder rollers 16 and a back-up roller 16'.

A lower registering plate 17 is arranged adjacent the lower plane of advancement and positioned so as to extend obliquely upwards towards this plane. A registering roller 18 is supported against the upper portion of the lower registering plate 17 and is intended to unite together a top and a bottom sheet. Presser rollers 19 and 20 are arranged to press together the sheets in a twostep operation, and to carry the united sheets 2, 4 to the discharge unit 8.

The machine is arranged to carry the undermost of the top sheets 2 past the separating rail 10 with the aid of the upper belt conveyor 9, which rail prevents passage of more than one sheet. Relief wedges 21 prevent the sheet immediately above from coming into contact with the belt conveyor 9 before the undermost sheet has reached a position wherein it is grasped in the nip formed by rollers 11. The belt conveyor 9 is arranged to stop when the sheet has been transported over a distance that somewhat exceeds the distance between the pile of sheets and the nip of rollers 11, which rollers operate at a speed synchronously with that of the belt conveyor.

When the sheet has passed the feeder roller pair 11 it slides down along the upper registering plate 13 until its leading edge abuts against the lower registering plate 17. In doing so it activates a photoelectric switch 22, whereby the lower belt conveyor 9 is started. The latter is arranged to carry the lowermost of sheets 4 past the separating rail 10 up to the lower pair of feeder rollers 12. When the bottom sheets 4 are stiff pasteboard or corrugated cardboard, relief wedges similar to wedges 21 are not required.

Figure 3:
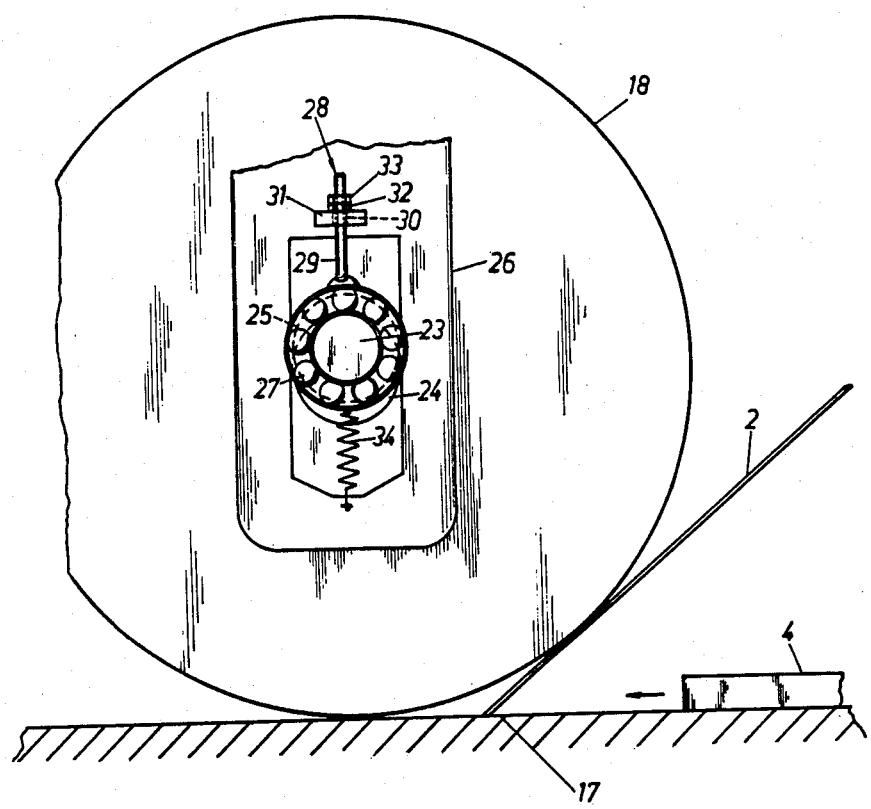
FIG. 3 shows on an enlarged scale an end view of the registering roll incorporated in the machine.
Figure 4:
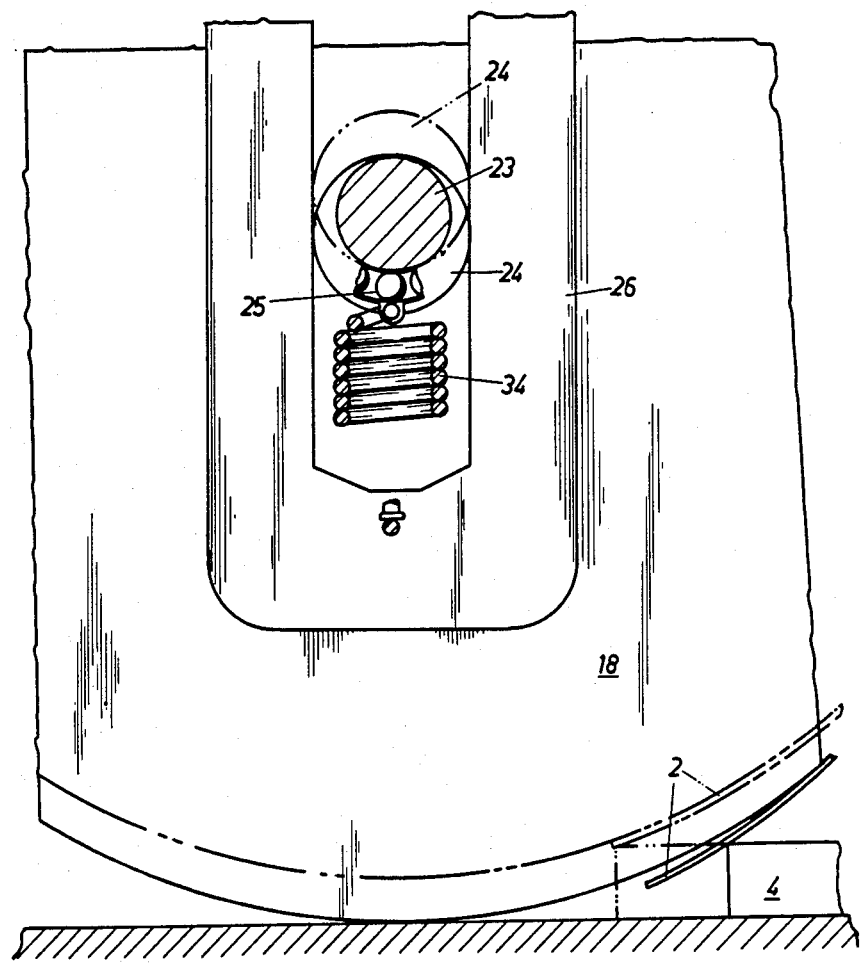
FIGS. 4 and 5 show the registering roll in further enlarged views in two different positions when registering and aligning two sheets.
Figure 5:
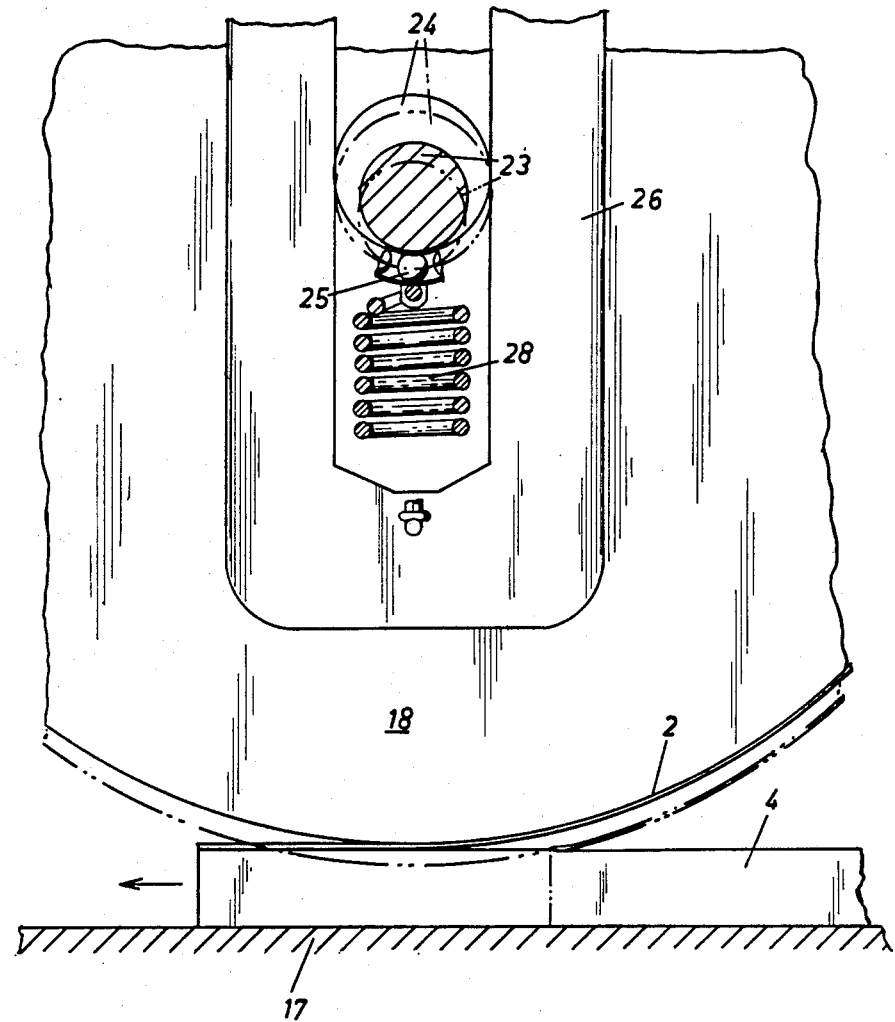

Feeder rollers 12 carry the sheet 4 up to the glue-applicator 15 which applies glue to the upper face of the sheet. Roller pair 16 is driven at the same speed as the roller pair 12 and the glue-applicating rollers 15. The sheet, thus provided with glue, is advanced further and its leading edge is directed upwards by means of the registering plate 17 so as to be level with the plane of advancement. FIG. 3 illustrates the top sheet 2 when resting against the registering plate 17 adjacent the registering roller 18, and the bottom sheet 4, with the glue applied thereon, travelling towards these means 17 and 18.

The registering roller 18 is mounted with some play 24 on a shaft 23, said shaft 23 extending crosswise relative to the lengthwise direction of the path. The shaft 23 is in turn mounted so as to be vertically movable with the aid of ball bearings 25 in guides 26 in the machine. An outer ball bearing 27 serves as an attachment means to secure a device 28 by means of which the level of the shaft 23 in the guide 26 is controlled. The device 28 comprises an adjustment arm 29 which runs through an aperture 30 in a shoulder member 31, the latter being arranged on the guide 26. The outer end of the adjustment arm 29 has a threaded section matching an adjustment nut 32 and a securing nut 33. The outer ball bearing 27 also serves as a support for a spring means 34 the opposite end of which is arranged in the guide 26.

When the glued bottom sheet 4 is advanced its upper leading edge abuts against the top sheet 2 at a point somewhat behind the leading edge of the latter. As a result, the top sheet 2 will be bent in underneath the registering roller 18. This makes the roller 18 swing somewhat on the shaft 23 in the direction of advancement of the sheet, the play 24 being somewhat displaced clockwise upwards on top of the shaft 23 and the roller pushes vertically upwards against the shaft. The latter is lifted against the action of the spring means 34 and the top sheet 2 is superposed on the glued bottom sheet 4. Because the roller is able to move laterally and upwards relative to the shaft 23 is exerts a comparatively small pressure on the sheets at this stage. The bottom sheet 4 slides in underneath the top sheet 2, since the latter has a comparatively large area of abutment against the registering plate 13 and is retained by the latter. Assuming that the device 28 designed to control the level of the shaft 23 is correctly set, the roller 18 will abut against the shaft at the very same instant that the leading edge of the bottom sheet 4 reaches the leading edge of the top sheet 2, and the shaft 23 is lifted against the action of the spring means 34, whereby the two sheets will be united in perfect alignment and register.

The press rollers 19, 20 are driven synchronously with the rollers 15, 16 forming part of glue-applicating means 5. Because the pressure is exerted by two juxtaposed pairs of rollers the lined sheet will be prefectly even and level. When the top sheet 2 is moved past the photoelectric cell 22 the deposit unit 1 receives a signal to start feeding and depositing another top sheet 2.

The machine in accordance with the invention can be easily adjusted for various qualities of pasteboard or cardboard. The sheet-deposit units 1 and 3 may be readjusted to sheets of different dimensions or be replaced by rollers designed to units two endless webs. The machine may also be used to line cardboard sheets with a textile material. It is likewise possible to unite sheets having different fibre orientations, in which case the end product will be sheets having crossing fibres, which makes the sheet very stiff. Sheets of this kind may replace high gram-weight or high substance cardboard, which saves raw material. With the machine in accordance with the invention lined pasteboard with crossing fibres may also be produced in a simpler manner and at lower costs than has hitherto been possible.

The invention is not limited to the embodiment described in the aforegoing but a variety of modifications are possible within the scope of the appended claims. The feeder rollers 11, 12 and 16, for instance, are not indispensable in order to carry out the invention. The mounting of the registering roller 18 relative to the shaft 23 may be arranged in another manner than that shown herein as may also the device 28 serving to adjust the level of shaft 23. The photoelectric cell 22 may be replaced by other sensing means. The presser means 7 may be combined with a dryer device. The registering plate 13 and 17 may be arranged for adjustable settings at different angles. Also, the shaft 23 may be adjustable vertically and pre-set at a predetermined angle in the horizontal plane to accommodate sheets the leading edge of which is unevenly cut. The registering roller 18 may be divided into several segments. These segments may even have different diameters.

I claim:

1. A sheet laminating machine for uniting two or several sheets in aligned and superposed relationship to form a multiply sheet, said machine comprising an upper sheet-deposit unit for feeding and positioning the top sheet or sheets, a lower sheet-deposit unit for feeding and positioning the bottom sheet, means designed to apply glue to the upper face of the bottom sheet, means for registering the sheets, presser means and a discharge unit, said registering means consists of an upper registering plate which is designed to guide the top sheets from the upper sheet-deposit unit up to the plane of advancement of the bottom sheets, and of a lower registering plate which is designed to guide the lower sheets in underneath a registering roller, characterized in that said roller resting, in its starting position, on the lower registering plate and being mounted on a shaft with some play, said shaft extending transversely of the plane of advancement of the sheets and being mounted so as to be vertically movable.

2. A machine as claimed in claim 1, characterised in that the presser means are two pairs of rollers.

3. A machine as claimed in claim 2, characterised in that said roller pairs, the glue-applicator means, back-up and feeder rollers and said discharge unit are driven synchronously and are so mutually spaced apart as to ensure that the bottom sheet is maintained in its lateral position by at least two driven pairs of rollers throughout its entire path of travel through the machine.

4. A machine as claimed in claim 1, characterised in that said shaft is vertically adjustable.

5. A machine as claimed in claim 1, characterised in that said shaft is arranged to be pre-set at a predetermined angle in the horizontal plane.

6. A machine as claimed in claim 1, characterised in that said upper registering plate is arranged at an angle to the plane of advancement of said bottom sheets, the angle being such as to ensure that said top sheets slide towards said plane of advancement by gravity.

7. A machine as claimed in claim 1, characterised in that means are provided to sense the passage of the leading edge of a top sheet past the upper registering plate and thereby to initiate advancement of a bottom sheet and to sense the passage of the trailing edge of said top sheet, whereby advancement of a fresh top sheet is initiated.

* * * * *